United States Patent
Zhao et al.

(10) Patent No.: US 12,278,893 B2
(45) Date of Patent: Apr. 15, 2025

(54) LIGHTWEIGHT SECURITY FOR INTERNET OF THINGS MESSAGING

(71) Applicant: EMC IP Holding Company LLC, Hopkinton, MA (US)

(72) Inventors: Junping Zhao, Beijing (CN); Mohamed Sohail, Sheikh Zayed (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 390 days.

(21) Appl. No.: 15/962,072

(22) Filed: Apr. 25, 2018

(65) Prior Publication Data
US 2019/0334701 A1   Oct. 31, 2019

(51) Int. Cl.
*H04L 9/08*   (2006.01)
*G06F 21/60*  (2013.01)
*H04L 9/14*   (2006.01)

(52) U.S. Cl.
CPC .......... *H04L 9/085* (2013.01); *G06F 21/602* (2013.01); *H04L 9/14* (2013.01)

(58) Field of Classification Search
None
See application file for complete search history.

(56) References Cited

U.S. PATENT DOCUMENTS 4,802,220 A * 1/1989 Marker, Jr. ........ H04Q 11/0428
                                                713/150
6,021,203 A * 2/2000 Douceur .............. H04L 9/0656
                                                380/252

(Continued)

FOREIGN PATENT DOCUMENTS

CA   2766719 A1 *  2/2011  ......... H04L 63/0428
EP   0112943 A1 *  7/1984

(Continued)

OTHER PUBLICATIONS

Kurihara, J., Kiyomoto, S., Fukushima, K., and Tanaka, T.: A New (k,n)-Threshold Secret Sharing Scheme and Its Extension. In Proceedings of the 11th international Conference on information Security (Taipei, Taiwan), 2008.*

(Continued)

*Primary Examiner* — Syed A Zaidi
*Assistant Examiner* — Vadim Savenkov
(74) *Attorney, Agent, or Firm* — Ryan, Mason & Lewis, LLP

(57) ABSTRACT

An apparatus in one embodiment comprises a processing platform configured to communicate over a network with a plurality of Internet of Things (IoT) devices. The processing platform receives at least a first intermediate message from a first gateway of the network, receives one or more additional intermediate messages from each of one or more additional gateways of the network, associates the first and additional intermediate messages with one another based at least in part on a common message identifier detected in each such intermediate message, and processes the associated first and additional intermediate messages to recover a device message from a given one of the IoT devices. The first intermediate message is based at least in part on at least one application of a designated cryptographic function to the device message utilizing a corresponding key. At least one of the one or more additional intermediate messages provides at least a portion of the key.

20 Claims, 7 Drawing Sheets

(56) References Cited

U.S. PATENT DOCUMENTS

| | | | | |
|---|---|---|---|---|
| 6,035,041 | A * | 3/2000 | Frankel | H04L 9/302 380/28 |
| 6,122,743 | A * | 9/2000 | Shaffer | H04L 45/24 726/3 |
| 6,182,214 | B1 * | 1/2001 | Hardjono | H04L 9/085 380/255 |
| 7,043,022 | B1 * | 5/2006 | Blanchard | H04L 12/4633 370/389 |
| 7,171,493 | B2 * | 1/2007 | Shu | H04L 12/4633 709/238 |
| 7,916,739 | B2 * | 3/2011 | Trostle | H04L 63/0428 370/401 |
| 9,032,203 | B2 * | 5/2015 | Takenaka | H04L 63/0428 713/153 |
| 9,219,604 | B2 * | 12/2015 | Resch | H04L 9/3093 |
| 9,942,212 | B2 * | 4/2018 | Gremaud | H04L 9/0662 |
| 9,998,434 | B2 * | 6/2018 | Verzun | H04L 9/34 |
| 10,084,600 | B1 * | 9/2018 | Irwan | H04L 9/3236 |
| 10,169,598 | B1 * | 1/2019 | Medina, III | H04L 63/0428 |
| 10,225,075 | B1 * | 3/2019 | Moritz | H04L 9/3226 |
| 10,230,702 | B1 * | 3/2019 | Moritz | H04L 9/3215 |
| 10,354,084 | B2 * | 7/2019 | Damgård | H04L 9/0894 |
| 10,721,062 | B2 * | 7/2020 | Chen | H04L 9/0894 |
| 10,805,344 | B2 * | 10/2020 | Britt | H04W 12/0433 |
| 11,057,293 | B2 * | 7/2021 | Aguado Martín et al. | H04L 9/085 |
| 2002/0015422 | A1 * | 2/2002 | Inada | H04L 63/0428 370/474 |
| 2002/0120874 | A1 * | 8/2002 | Shu | H04L 25/14 726/26 |
| 2003/0081582 | A1 * | 5/2003 | Jain | H04M 7/1295 370/338 |
| 2003/0126303 | A1 * | 7/2003 | Kadakia | H04L 63/126 719/313 |
| 2003/0167314 | A1 * | 9/2003 | Gilbert | H04L 9/40 709/217 |
| 2004/0179686 | A1 * | 9/2004 | Matsumura | H04L 9/085 380/44 |
| 2006/0129811 | A1 * | 6/2006 | Fiske | H04L 9/0631 713/167 |
| 2008/0022389 | A1 * | 1/2008 | Calcev | H04W 40/28 726/14 |
| 2008/0034197 | A1 * | 2/2008 | Engel | H04L 63/0428 713/150 |
| 2008/0144836 | A1 * | 6/2008 | Sanders | H04L 9/085 380/278 |
| 2011/0138192 | A1 * | 6/2011 | Kocher | H04L 9/3247 713/189 |
| 2012/0084368 | A1 * | 4/2012 | Go | H04L 61/2575 709/206 |
| 2013/0227292 | A1 * | 8/2013 | Suffling | H04L 63/061 713/171 |
| 2013/0290701 | A1 * | 10/2013 | Takenaka | H04L 9/3215 713/153 |
| 2015/0186671 | A1 * | 7/2015 | O'Hare | H04L 9/0894 713/167 |
| 2015/0310219 | A1 * | 10/2015 | Haager | H04L 9/0894 713/165 |
| 2016/0315921 | A1 * | 10/2016 | Dara | H04L 41/0866 |
| 2017/0310472 | A1 * | 10/2017 | Garcia-Morchon | H04L 9/083 |
| 2017/0331800 | A1 * | 11/2017 | Wood | G06F 11/327 |
| 2018/0139190 | A1 * | 5/2018 | Chaum | H04L 9/008 |
| 2018/0241548 | A1 * | 8/2018 | Dolev | H04L 9/0656 |
| 2018/0302386 | A1 * | 10/2018 | Childress | H04W 4/70 |
| 2018/0359811 | A1 * | 12/2018 | Verzun | H04L 12/28 |
| 2019/0014094 | A1 * | 1/2019 | Le Saint | H04L 63/06 |
| 2019/0306129 | A1 * | 10/2019 | Waltermann | H04L 9/0637 |
| 2019/0306135 | A1 * | 10/2019 | Mudulodu | H04L 63/0435 |
| 2021/0195393 | A1 * | 6/2021 | Jiménez | H04W 4/70 |
| 2021/0367775 | A1 * | 11/2021 | Grau | G16Y 30/10 |

FOREIGN PATENT DOCUMENTS

| | | | | |
|---|---|---|---|---|
| EP | | 3528430 A1 * | 8/2019 | H04L 45/021 |
| WO | WO-2006130991 | A1 * | 12/2006 | H04L 63/02 |
| WO | WO-2018125989 | A2 * | 7/2018 | G06F 16/1824 |
| WO | WO-2019110574 | A1 * | 6/2019 | G06F 21/33 |

OTHER PUBLICATIONS

M. Z. A. Bhuiyan, M. Zaman, G. Wang, T. Wang and J. Wu, "Privacy-Protected Data Collection in Wireless Medical Sensor Networks," 2017 International Conference on Networking, Architecture, and Storage (NAS), 2017, pp. 1-2, doi: 10.1109/NAS.2017.8026872.*

E. Luo, M. Z. A. Bhuiyan, G. Wang, M. A. Rahman, J. Wu and M. Atiquzzaman, "PrivacyProtector: Privacy-Protected Patient Data Collection in IoT-Based Healthcare Systems," in IEEE Communications Magazine, vol. 56, No. 2, pp. 163-168, Feb. 2018, doi: 10.1109/MCOM.2018.1700364.*

S. Bouam and J. Ben-Othman, "Data security in ad hoc networks using multipath routing," 14th IEEE Proceedings on Personal, Indoor and Mobile Radio Communications, 2003. PIMRC 2003., Beijing, China, 2003, pp. 1331-1335 vol. 2, doi: 10.1109/PIMRC.2003.1260329.*

Al-Rousan, M. & Rjoub, A & Baset, Ahmad. (2009). A Low-Energy Security Algorithm for Exchanging Information in Wireless Sensor Networks. Journal of Information Assurance and Security. 450. 48-59.*

1. Ghafoor A, Sher M, Imran M, Derhab A. Secure Key Distribution Using Fragmentation and Assimilation in Wireless Sensor and Actor Networks. International Journal of Distributed Sensor Networks. 2015;11(9). doi:10.1155/2015/542856.*

K. Sakai, M.-T. Sun, W.-S. Ku, J. Wu and T. H. Lai, "Multi-path Based Avoidance Routing in Wireless Networks," 2015 IEEE 35th International Conference on Distributed Computing Systems, Columbus, OH, USA, 2015, pp. 706-715, doi: 10.1109/ICDCS.2015.77.*

L. Czap, C. Fragouli, V. M. Prabhakaran and S. Diggavi, "Secure Network Coding With Erasures and Feedback," in IEEE Transactions on Information Theory, vol. 61, No. 4, pp. 1667-1686, Apr. 2015, doi: 10.1109/TIT.2015.2402272.*

Li, C. T., & Hwang, M. S. (2011). A lightweight anonymous routing protocol without public key en/decryptions for wireless ad hoc networks. Information Sciences, 181(23), 5333-5347.*

H. Mohammed, S. Tonyali, K. Rabieh, M. Mahmoud and K. Akkaya, "Efficient Privacy-Preserving Data Collection Scheme for Smart Grid AMI Networks," 2016 IEEE Global Communications Conference (Globecom), Washington, DC, USA, 2016, pp. 1-6, doi: 10.1109/Glocom.2016.7841782.*

Pubnub, Inc., "A New Approach to IoT Security: 5 Key Requirements to Securing IoT Communications," https://www.pubnub.com/static/papers/IoT_Security_Whitepaper_Final.pdf, Jun. 29, 2015, 8 pages.

Wikipedia, "Onion Routing," https://en.wikipedia.org/wiki/Onion_routing, Mar. 16, 2018, 4 pages.

Frank Zhao et al., "Improved Reliable Streaming Processing: Apache Storm as Example," https://www.slideshare.net/HadoopSummit/improved-reliable-streaming-processing-apache-storm-as-example, Sep. 6, 2016, 34 pages.

* cited by examiner

LIGHTWEIGHT SECURITY FOR INTERNET OF THINGS MESSAGING

FIELD

The field relates generally to information processing systems, and more particularly to information processing systems that process information from devices associated with the Internet of Things (IoT).

BACKGROUND

Information processing systems can be configured to process data from distributed sensors, smart objects, smart appliances, smart automobiles or other types and arrangements of IoT devices. However, as the number of IoT devices continues to increase, the implementation of IoT-based systems under conventional practice presents a number of significant problems. For example, these systems can be very difficult to scale to increasingly larger numbers of IoT devices of different types due at least in part to the challenges of providing reliable security for messages transmitted from the IoT devices to downstream processing devices. In many cases, IoT devices are installed without adequate built-in security functionality. These IoT devices often have relatively small form factors and therefore have insufficient computational resources to implement complex cryptographic protocols.

SUMMARY

Illustrative embodiments provide techniques for securing messages transmitted by IoT devices in an information processing system. For example, some embodiments implement "lightweight" techniques for message security that consume minimal computational resources on the IoT devices and associated gateways. Such arrangements can provide a very high level of security for IoT device messages transmitted through a network to a cloud-based data center or other processing platform. The disclosed messaging security techniques are highly efficient and require little or no additional coordinated management between the IoT devices, the gateways and the destination processing platform.

In one embodiment, an apparatus comprises a processing platform configured to communicate over a network with a plurality of IoT devices. The processing platform is further configured to receive at least a first intermediate message from a first gateway of the network, to receive one or more additional intermediate messages from each of one or more additional gateways of the network, to associate the first and additional intermediate messages with one another based at least in part on a common message identifier detected in each such intermediate message, and to process the associated first and additional intermediate messages to recover a device message from a given one of the IoT devices. The first intermediate message is based at least in part on at least one application of a designated cryptographic function to the device message utilizing a corresponding key. At least one of the one or more additional intermediate messages provides at least a portion of the key.

The designated cryptographic function may comprise a bitwise exclusive-or (XOR) function, although other types of cryptographic functions can be used in other embodiments. The common message identifier may comprise a randomly-generated message identifier that is unique to the device message.

The common message identifier may be generated by the given IoT device or by a first layer of parallel gateways that the given IoT device utilizes in communicating the device message to the processing platform.

In some embodiments, the one or more additional intermediate messages comprise a plurality of additional intermediate messages that collectively provide the key. The processing platform is illustratively configured to combine respective portions of the associated first and additional intermediate messages using the designated cryptographic function to recover the device message.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated IoT devices and other processing devices. It is to be appreciated, however, that these and other embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments. The term "cloud infrastructure" as used herein is intended to be broadly construed to encompass these and other information processing system environments that include at least a portion of at least one cloud.

Figure 1:
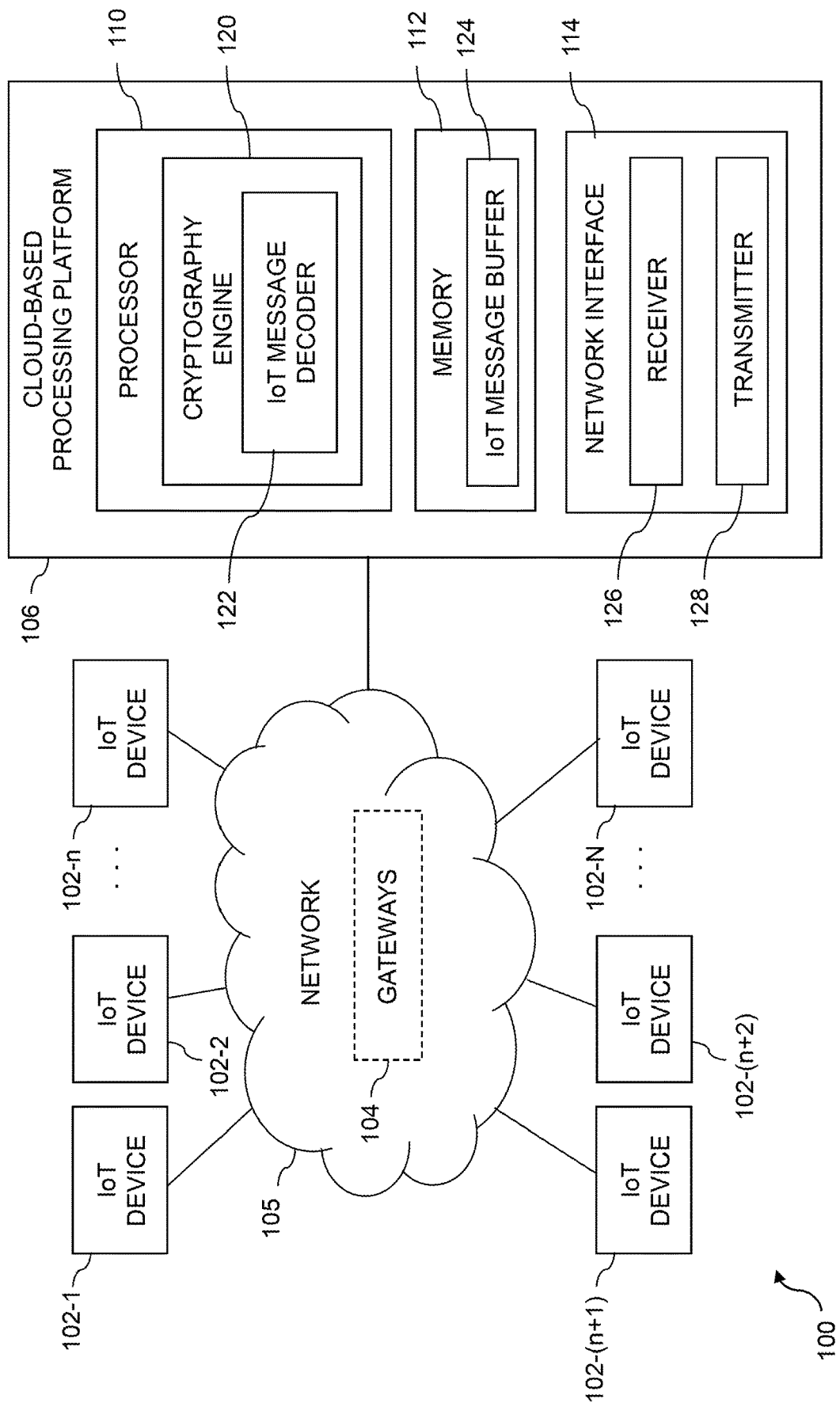
FIG. 1 is a block diagram of an information processing system configured with secure IoT messaging functionality in an illustrative embodiment.

FIG. 1 shows an information processing system 100 configured in accordance with an illustrative embodiment of the present invention. The information processing system 100 comprises a plurality of IoT devices 102-1, 102-2, ... 102-n, 102-(n+1), 102-(n+2), ... 102-N, which are configured to communicate via gateways 104 of a network 105 with a cloud-based processing platform 106.

The cloud-based processing platform 106 is assumed to comprise a plurality of processing devices each having a processor coupled to a memory. One or more such processing devices may be implemented at least in part utilizing one or more virtual machines, containers or other types of virtualization infrastructure. Examples of processing platform implementations will be described below in conjunction with FIGS. 6 and 7.

The cloud-based processing platform 106 may more particularly comprise a cloud-based data center or other cloud-based computer system, although other types of processing platforms may be used in other embodiments. For example, in some embodiments, the processing platform 106 may comprise an enterprise-based computer system rather than a cloud-based computer system.

The IoT devices 102 in this embodiment comprise, for example, distributed sensors, smart appliances, smart automobiles or other types and arrangements of devices that generate various types of IoT data traffic. The range of different IoT device types that can be incorporated in a given implementation is essentially unlimited. Further examples include thermostats, garage door openers, alarm systems and numerous additional devices in various IoT environments, such as residential, industrial, transportation, healthcare and many others. Some of the IoT devices are configured to send and receive machine-to-machine (M2M) communications in accordance with standardized M2M protocols.

The information processing system 100 may additionally comprise various non-IoT devices, such as, for example, desktop, laptop or tablet computers, mobile telephones, or other types and arrangements of devices that generate various types of non-IoT data traffic, although such non-IoT devices are not explicitly shown in the figure.

One or more of the IoT devices 102 can comprise hybrid devices that generate both IoT data traffic and non-IoT data traffic. For example, a given IoT device can be configured so as to generate IoT data traffic in some operating modes of the device and to generate non-IoT data traffic in other operating modes of the device.

Some of the IoT devices 102 in illustrative embodiments can be associated with respective system users. The term "user" in this context and elsewhere herein is intended to be broadly construed so as to encompass, for example, human, hardware, software or firmware entities, as well as various combinations of such entities.

The network 105 may comprise any of a variety of different types of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks. As a more particular example, at least a portion of the network 105 may comprise an access network. Such an access network illustratively comprises a wireless network such as a cellular network, a WiMAX network or a WiFi network, or a combination of multiple such wireless networks. The access network more particularly includes one or more base stations that support one or more air interfaces over which the base stations communicate with the IoT devices 102.

The cloud-based processing platform 106 is configured to communicate via the gateways 104 of network 105 with the IoT devices 102. As will be described in more detail below, the system 100 is configured to process messages sent by the IoT devices 102 over the network 105 to the processing platform 106 in a manner that provides security for such messages using minimal computational resources.

It should be noted that the term "message" as used herein is intended to be broadly construed, and should not be interpreted as requiring any particular message format or messaging protocol.

In conjunction with the processing of a device message from a given one of the IoT devices 102, the processing platform 106 is configured to receive at least a first intermediate message from a first one of the gateways 104 of the network 105, to receive one or more additional intermediate messages from each of one or more additional ones of the gateways 104 of the network 105, to associate the first and additional intermediate messages with one another based at least in part on a common message identifier detected in each such intermediate message, and to process the associated first and additional intermediate messages to recover the device message from the given IoT device.

The first intermediate message is illustratively based at least in part on at least one application of a designated cryptographic function to the device message utilizing a corresponding key, and at least one of the one or more additional intermediate messages provides at least a portion of the key.

The designated cryptographic function illustratively comprises a bitwise XOR function, although other types of cryptographic functions can be used in other embodiments. The bitwise XOR function is an example of a lightweight cryptographic function that can be implemented using minimal computational resources. Moreover, repeated applications of the bitwise XOR function exhibit the commutative property, which provides advantages in certain illustrative embodiments.

The common message identifier illustratively comprises a randomly-generated message identifier that is unique to the device message. The common message identifier may be generated by the given IoT device. Alternatively, the common message identifier may be generated in a first layer of parallel instances of the gateways 104 that the given IoT device utilizes in communicating the device message to the processing platform 106. It is also possible that a monotonically increasing counter may be used by an IoT device or associated gateway in generating the common message identifier.

In some embodiments, the one or more additional intermediate messages comprise a plurality of additional intermediate messages that collectively provide the key. The processing platform 106 is illustratively configured to combine respective portions of the associated first and additional intermediate messages using the designated cryptographic function to recover the device message.

The cloud-based processing platform 106 comprises a processor 110, a memory 112 and a network interface 114.

The processing of the first and additional intermediate messages received from the respective first and additional ones of the gateways 104 to recover the device message from the given IoT device in the FIG. 1 embodiment is performed at least in part by cryptography engine 120 of processor 110. The cryptography engine 120 more particularly comprises an IoT message decoder 122 that illustratively combines respective portions of the associated first and additional intermediate messages to recover the device message. The first and additional intermediate messages when received by the processing platform 106 are stored in an IoT message buffer 124 of the memory 112. The first and additional messages and the device message are also referred to herein as "IoT messages." The network interface 114 comprises a receiver 126 and a transmitter 128, each configured to communicate with at least a subset of the gateways 104 over at least a portion of the network 105.

Additional features of processing platform components such as processor 110, memory 112 and network interface 114 will be described in more detail below in conjunction with the illustrative embodiments of FIGS. 6 and 7.

It is to be appreciated that components such as the cryptography engine 120 and the IoT message buffer 124 can be implemented within respective separate physical systems in some embodiments. A processing platform such as the cloud-based processing platform 106 in the FIG. 1 embodiment can therefore be implemented as a combination of multiple distinct physical systems or as a single physical system.

It should be understood that the particular IoT devices, gateways, networks, processing platforms and other components implemented in the system 100 as illustrated in FIG. 1 are presented by way of example only. In other embodiments, only subsets of these components, or additional or alternative sets of components, may be used, and such components may exhibit alternative functionality and configurations.

The cloud-based processing platform 106 in some embodiments comprises one or more compute nodes with each such compute node comprising one or more host devices. The compute nodes can be implemented on the same processing platform. Alternatively, different compute nodes can be implemented on respective different processing platforms coupled together via the network 105.

The compute nodes may comprise respective compute nodes of cloud infrastructure, such as an Amazon Web Services (AWS) system. Other examples of cloud-based systems that can be used to implement compute nodes and their respective host devices and possibly other portions of system 100 include Google Cloud Platform (GCP) and Microsoft Azure. The compute nodes may be implemented on a per-tenant basis and extend in a distributed manner across host devices of multiple public, private or hybrid clouds.

A given such cloud can comprise a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

Additional examples of the particular manner in which a data center or other type of cloud-based processing platform can recover a device message sent securely from an IoT device through one or more gateways will now be described with reference to the illustrative embodiments of FIGS. 2 through 5.

Figure 2:
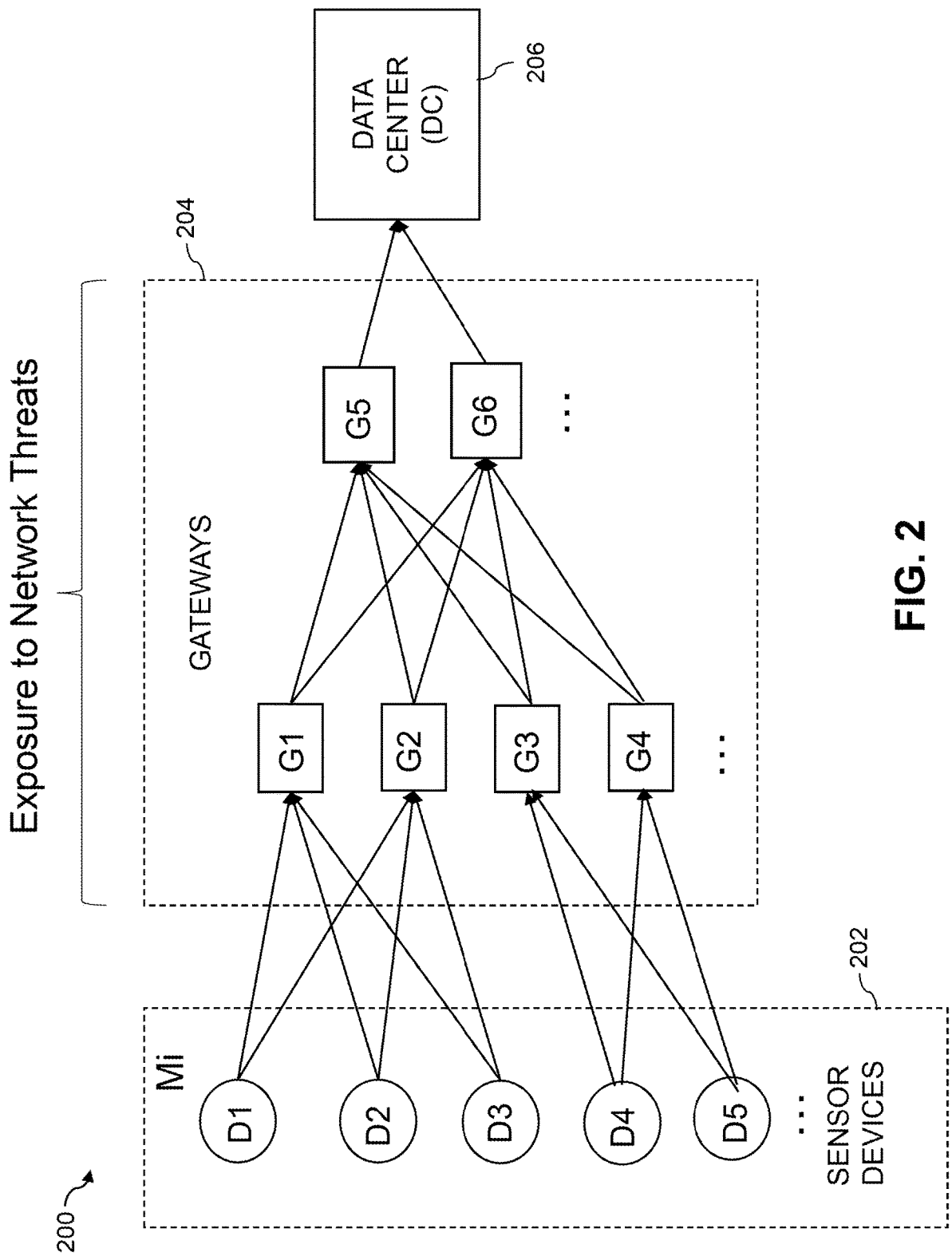
FIGS. 2 through 5 show additional examples of information processing systems with secure IoT messaging functionality in other embodiments.

Referring now to FIG. 2, an information processing system 200 implementing lightweight security for IoT messaging comprises a set of IoT devices 202 that more particularly comprise respective sensor devices denoted D1, D2, D3, D4 and D5. The IoT devices 202 communicate through gateways 204 with a data center (DC) 206.

The gateways 204 in this embodiment are arranged in a cascade-connected configuration to support features such as high availability (HA) or message load balancing. More particularly, the gateways 204 are arranged in first and second layers of parallel gateways. The first layer comprises parallel gateways denoted G1, G2, G3 and G4, and the second layer comprises parallel gateways denoted G5 and G6. Additional gateways or gateway layers not explicitly shown in the figure may be included in the system 200.

Each of the IoT devices 202 utilizes multiple gateways in each of the first and second layers of gateways in communicating device messages to the data center 206. For example, each of the sensor devices D1 through D5 may generate device messages such as device message Mi at designated intervals that are periodic or event-based. The device messages are typically small, having a size on the order of bytes or kilobytes (KB), and the intervals between pairs of consecutive messages from the same sensor device may be long, on the order of milliseconds, seconds or longer, although embodiments disclosed herein are not limited to any particular message size, message format or message signaling interval.

The device message Mi is an initial message and may be unencrypted. It may be generated or otherwise transmitted by a corresponding one of the IoT devices 202, illustratively the sensor device D1.

The device messages such as device message Mi are transmitted via the gateways 204 to the data center 206, which is assumed to comprise a trusted processing platform. However, in traversing the network comprising gateways 204, the device messages are exposed to network threats, and therefore are provided with security protection of the type disclosed herein. As will be described, this lightweight security for IoT device messaging protects the device messages in transit from the IoT devices 202 to the data center 206. In some embodiments, the device message Mi may itself be encrypted, in order to provide additional security beyond that provided by the lightweight security techniques disclosed herein.

Figure 3:
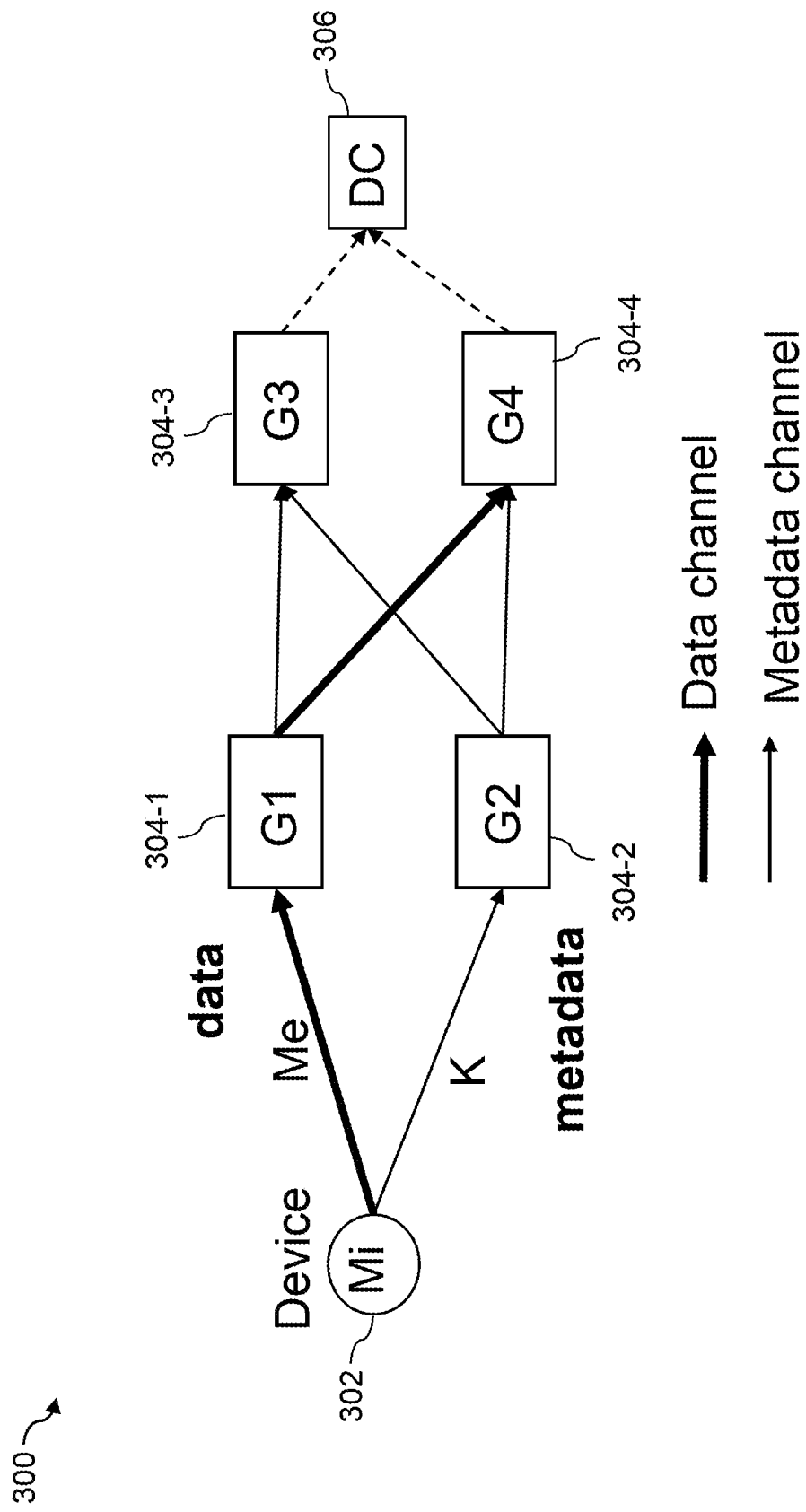

FIG. 3 illustrates an example of the processing of a given IoT message in more detail. In information processing system 300, an IoT device 302 generates an unencrypted message Mi. The IoT device 302 is configured to transmit the message Mi via gateways 304 to a data center 306 using lightweight security techniques. The IoT device 302 encrypts the message Mi using a key K to generate a corresponding encrypted message Me. The IoT device 302 selects from a set of available channels to multiple first layer gateways 304-1 and 304-2, also denoted as G1 and G2, respectively, one channel to serve as a data channel and another channel to serve as a metadata channel. The selection of a particular data channel and a particular metadata channel from the set of available channels may be random selection or based on round robin or another suitable selection protocol.

The IoT device 302 transmits the encrypted message Me on the data channel, which illustratively includes a network path from the IoT device 302 to the first layer gateway 304-1, and transmits the key K on the metadata channel, which illustratively includes a network path from the IoT device 302 to the first layer gateway 304-2. The two different messages transmitted by the IoT device 302 in this embodiment may be viewed as examples of what are also referred to herein as "intermediate messages." These and other intermediate messages are utilized in secure transmission of the device message Mi via the gateways 304 to the data center 306 where the original device message Mi is recovered using particular intermediate messages that are received by the data center 306.

Each of the intermediate messages utilized in transmission of the device message Mi incorporates the same unique message identifier, also referred to herein as a common message identifier.

The encrypted message Me and its corresponding key K are eventually delivered via multiple second layer gateways 304-3 and 304-4, also denoted as G3 and G4, respectively, to the data center 306, using particular intermediate messages. The data center 306 detects the common message identifier to determine particular received intermediate messages that are associated with the same device message Mi.

The dashed lines between the second layer gateways 304-3 and 304-4 and the data center 306 can each carry one or more intermediate messages that may comprise a combination of data and metadata. Accordingly, these channels are not specifically identified as data channels or metadata channels in the figure. Similar dashed lines having a similar connotation are shown in the FIG. 5 embodiment.

The key K in the FIG. 3 embodiment is illustratively generated using pseudorandom techniques and it need not be persistently stored by the IoT device 302. It is used to encrypt the message Mi using a bitwise XOR function. More particularly, the bitwise XOR function is applied to the message Mi using the key K to generate the encrypted message Me. As indicated above, the bitwise XOR function is lightweight and efficient and can run well utilizing the typically limited computational resources of IoT device 302.

The data center 306 receives a first intermediate message and an additional intermediate message from respective ones of the second layer gateways 304. It associates the first and additional intermediate messages with one another based at least in part on a common message identifier detected in each such intermediate message, and processes the associated first and additional intermediate messages to recover the device message Mi from the IoT device 302. The first intermediate message in this example is based on application of the bitwise XOR function to the message Mi using the key K, and the additional intermediate message provides the key K. The data center 306 can therefore combine the encrypted message Me with the key K as received in the respective first and additional intermediate messages using the bitwise XOR function to recover the device message Mi.

It is important to note that no particular ordering of the first and additional intermediate messages is required in this and other illustrative embodiments, as the XOR function is a commutative function.

The FIG. 3 embodiment is an example of an arrangement in which the first intermediate message comprises the common message identifier and the result Me of a single application of the bitwise XOR function to the device message Mi using the key K. The additional intermediate message comprises the common message identifier and the key K. Numerous alternative arrangements are possible, additional examples of which will be described in more detail in conjunction with FIGS. 4 and 5 below.

Figure 4:
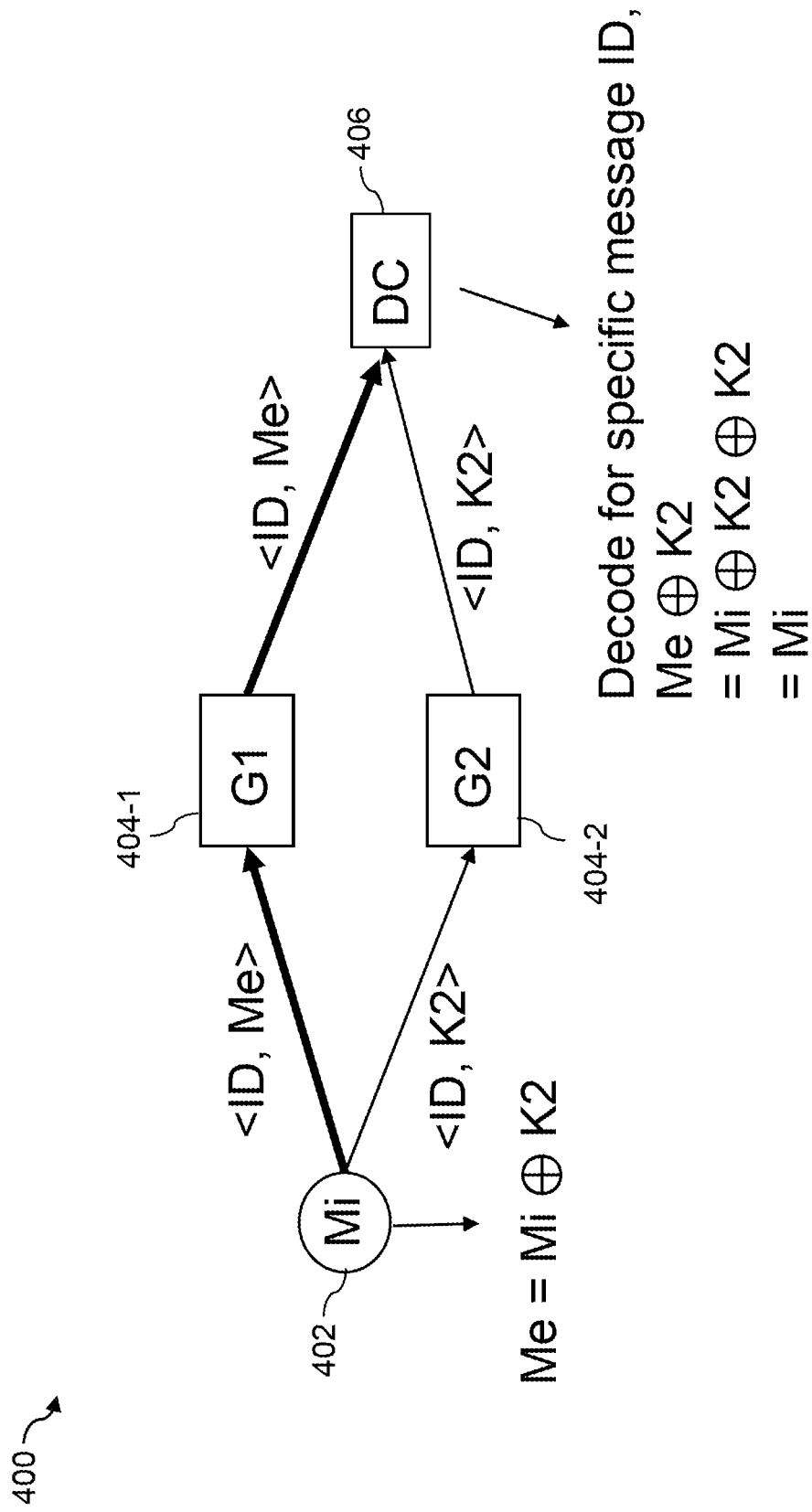

Referring now to FIG. 4, an information processing system 400 comprises an IoT device 402 and first layer gateways 404-1 and 404-2, also denoted as G1 and G2, respectively. The IoT device 402 generates a device message Mi and that device message is transmitted via the gateways 404 to a data center 406 as multiple intermediate messages that are processed at the data center 406 to recover the original device message Mi. In this embodiment, the IoT device 402 generates a key K2 using pseudorandom key generation techniques, and encrypts the device message Mi through application of bitwise XOR with the key K2 to obtain the encrypted message Me. The IoT device 402 selects a data channel and a metadata channel randomly or using round robin or another selection protocol as previously described, sends a first intermediate message <ID, Me> to the gateway 404-1 over the data channel, where ID denotes the common message identifier unique to message Mi, and further sends an additional intermediate message <ID, K2> to the gateway 404-2 over the metadata channel.

The data center 406 receives the first and additional intermediate messages via respective ones of the gateways 404, associates the intermediate messages via their respective common message identifiers, and combines the Me and K2 portions of the associated intermediate messages to decode the original device message Mi.

In another possible implementation of an arrangement similar to that of FIG. 3 or FIG. 4 as described above, the IoT device generates an m-bit device message Mi, and generates g different random m-bit keys K2, K3, . . . Kg, where g≥2 is one less than the number of parallel connected gateways in the first layer of gateways that the IoT device will use in communicating the device message to the data center. In the FIG. 4 example, there were only two parallel connected gateways in the first layer of gateways, so g=1 and only a single random m-bit key K2 was generated in that particular example.

The IoT device in the present more general embodiment combines the g different m-bit keys using the bitwise XOR function to generate a composite key Ki:

$$Ki = (K2 \oplus K3 \oplus \ldots )$$

where $\oplus$ denotes a bitwise XOR operation.

The IoT device then encrypts the device message Mi using the above-noted composite key Ki as follows:

$$Me = Mi \oplus Ki$$

and sends Me over a data channel to a first selected one of the gateways of the first layer. The corresponding intermediate message is of the form <ID, Me> where ID denotes the common message identifier. The IoT device also sends respective ones of the g keys used to generate the composite key Ki over respective ones of g metadata channels as corresponding intermediate messages <ID, K2>, <ID, K3> . . . , respectively.

This is an example of an illustrative embodiment in which one of the intermediate messages comprises the common message identifier and a result Me of applying the composite key Ki to the device message Mi, and additional intermediate messages each comprise the common message identifier and a corresponding one of the other keys K2, K3, . . . Kg used to generate the composite key Ki.

Each of at least a subset of the receiving gateways of the first layer of gateways can similarly perform additional encryption operations by application of the bitwise XOR operation to portions of their respective received intermediate messages, thereby generating new intermediate messages. The FIG. 5 embodiment to be described below is an example of an arrangement of this type.

In the FIG. 4 embodiment, which as noted above includes only a first layer of gateways 404, the first gateway 404-1 sends the first intermediate message <ID, Me> to the data center 406, and the second gateway 404-2 sends the additional intermediate message <ID, K2> to the data center 406. The data center 406 associates the first and additional intermediate messages with one another using their common message identifier, and then combines Me and K2 via the bitwise XOR function to recover device message Mi.

In the more general case of this embodiment, the receiving data center combines the encrypted message Me from one of the intermediate messages and the individual keys from respective other ones of the intermediate messages utilizing the bitwise XOR function in order to recover the original device message Mi.

The data center in this embodiment has no prior knowledge of the composite key Ki or the individual keys that are used to generate the composite key. In addition, it makes no assumptions regarding the ordering of the intermediate messages or which intermediate messages comprise data and which comprise metadata. Due to the commutative property of the XOR function, the data center need only identify related intermediate messages via their common ID and then combine portions of those intermediate messages using bitwise XOR in order to decode the original device message from the IoT device.

It is also possible that certain operations referred to in the foregoing description as being performed by an IoT device can instead be performed at least in part by a particular one of the gateways of a first layer of gateways. For example, the gateway 404-1 in the FIG. 4 embodiment can receive Mi from the IoT device 402, generate the common message identifier and the key K2, encrypt Mi by bitwise XOR with K2, send <ID, K2> to the gateway 404-2, and send <ID, Me> to the data center 406.

These and a wide variety of other alternative arrangements of secure IoT messaging can be implemented in illustrative embodiments, another example of which will now be described in conjunction with FIG. 5.

Figure 5:
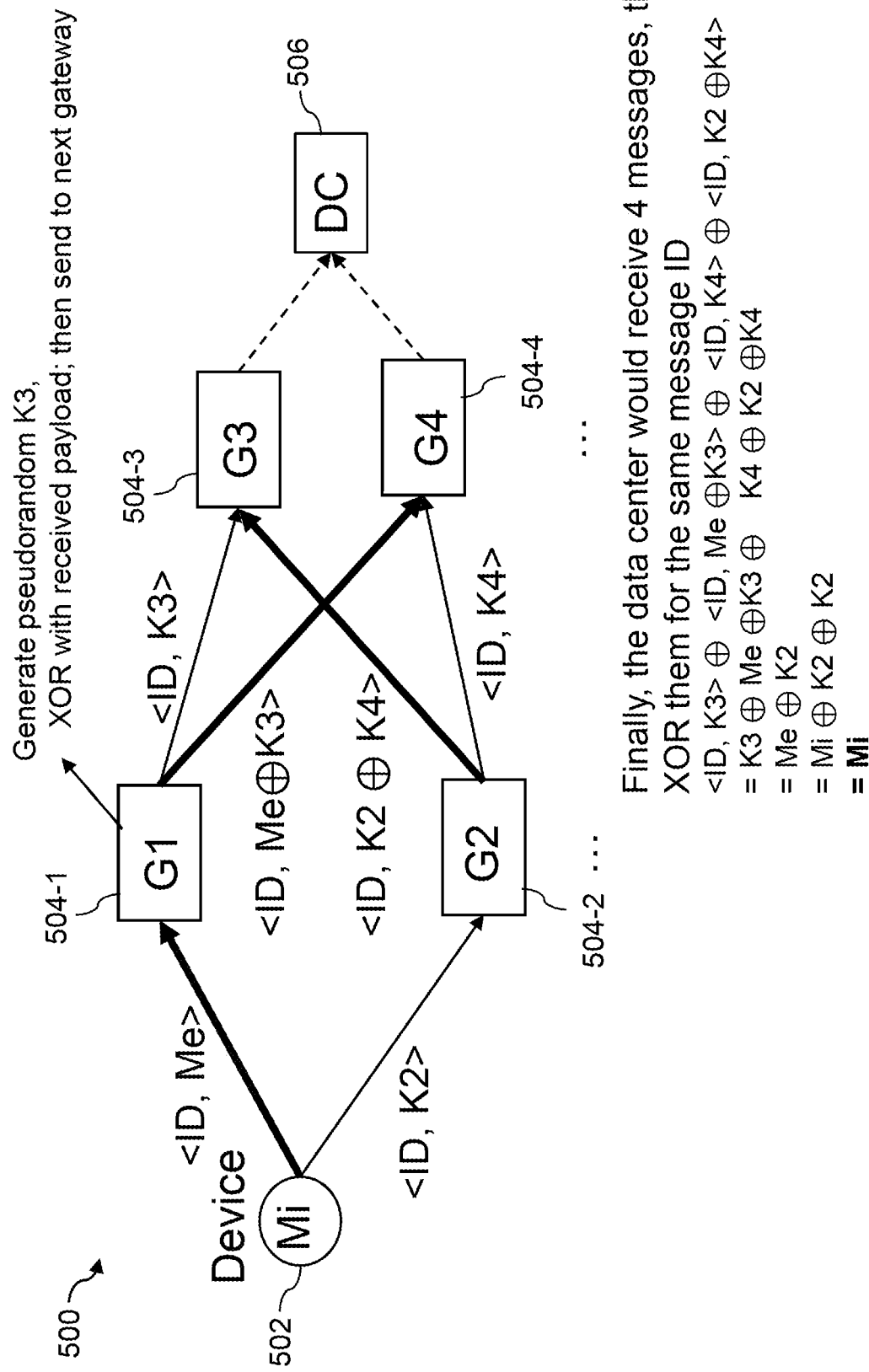

In the FIG. 5 embodiment, an information processing system 500 comprises an IoT device 502 that communicates via first and second layers of gateways 504 with a data center 506. The first layer of gateways 504 includes gateways 504-1 and 504-2, also denoted G1 and G2, respectively, and the second layer of gateways 504 includes gateways 504-3 and 504-4, also denoted G3 and G4, respectively. This embodiment is therefore structurally similar to the embodiment of FIG. 3.

However, as illustrated in FIG. 5, the gateway 504-1 generates a pseudorandom key K3, and further encrypts Me by bitwise XOR with K3. It then sends an intermediate message <ID, K3> to gateway 504-3, which is illustratively configured to forward the intermediate message <ID, K3> to the data center 506. The gateway 504-1 also sends an intermediate message <ID, Me⊕K3> to the gateway 504-4, which is illustratively configured to forward that message to the data center 506. Similarly, the gateway 504-2 generates a pseudorandom key K4, and further encrypts K2 by bitwise XOR with K4. It then sends an intermediate message <ID, K2⊕K4> to gateway 504-3, which is illustratively configured to forward the intermediate message <ID, K2⊕K4> to the data center 506. The gateway 504-2 also sends an intermediate message <ID, K4> to the gateway 504-4, which is illustratively configured to forward that message to the data center 506.

The data center 506 receives the above-noted intermediate messages from the second layer gateways 504-3 and 504-4, associates the messages with one another via their common message identifiers, and combines respective portions of the intermediate messages using bitwise XOR as illustrated in the figure to recover the original device message Mi.

The data center 506 does not require any prior knowledge of any of the keys used to provide the secure IoT messaging functionality, nor does it have to enforce any particular ordering among the received intermediate messages.

The FIG. 5 embodiment is an example of an arrangement in which a first intermediate message received by a data center from a gateway comprises the common message identifier and a result of multiple sequential applications of a designated cryptographic function to the device message using respective ones of a plurality of keys. An additional one of the intermediate messages comprises the common message identifier and a result of applying the designated cryptographic function to one of the keys using another one of the keys, and another one of the one or more additional intermediate messages comprises the common message identifier and the other key. Again, numerous alternative gateway and messaging configurations may be used in other embodiments.

As in other embodiments disclosed herein, the FIG. 5 embodiment can be modified such that portions of the operations performed by an IoT device such as IoT device 502 can instead be performed at least in part by one or more first layer gateways such as gateways 504-1 and 504-2. Such an arrangement may be appropriate, for example, in embodiments in which the IoT device has insufficient computing power to generate a unique message identifier, and the unique message identifier can instead be generated by a first layer gateway.

In other implementations of the FIG. 5 embodiment, instead of encrypting only a payload (e.g., Me or K2) of a given received intermediate message as illustrated, the first layer gateways and possibly other gateways of the system can be configured to encrypt entire received messages. The gateways can be configured in some embodiments to perform additional operations such as caching, batching or compression on the intermediate messages or portions thereof to improve performance and reduce messaging bandwidth.

Also, rather than preserving an entire unique message identifier as generated by an IoT device, the first layer gateways can instead preserve only an initial portion of the unique message identifier, such as the first eight bytes of the unique message identifier. A resulting truncated message identifier of this type is assumed to be encompassed by the term "common message identifier" as broadly used herein.

In some embodiments, the messages can be routed via the gateways of a network at least in part utilizing "onion routing" techniques in which messages are encapsulated in layers of encryption. A wide variety of other types of message routing protocols can be utilized in conjunction with the secure IoT messaging disclosed herein.

It should be noted that selection of a data channel and one or more metadata channels by each of the IoT device and the gateways is a variable selection rather than a fixed selection. Thus, a channel selected to convey data for one message can be selected to convey metadata for another message, and vice-versa.

Functionality for secure IoT messaging such as that described above in conjunction with illustrative embodiments can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 5 are presented by way of illustrative example only, and should not be construed as limiting in any way. As noted above, the described functionality for IoT message processing can be implemented using additional or alternative components. Accordingly, a wide variety of different IoT message processing arrangements can be used in other embodiments.

The illustrative embodiments described above provide significant advantages over conventional arrangements.

For example, some embodiments provide techniques for securing messages transmitted by IoT devices in an information processing system. These embodiments include "lightweight" techniques for message security that consume minimal computational resources on the IoT devices and associated gateways.

Such arrangements can provide a very high level of security for IoT device messages transmitted through a network to a cloud-based data center or other processing platform. The disclosed messaging security techniques are highly efficient and require little or no additional coordinated management between the IoT devices, the gateways and the destination processing platform.

In some embodiments, the secure IoT messaging techniques can be implemented in the form of a lightweight add-on proactive security layer arranged above conventional IoT messaging protocols.

Illustrative embodiments support a wide range of distinct use cases. For example, some embodiments can be configured to allow IoT device manufacturers to eliminate the burden of coordinating their security protocols with those of other IoT and M2M manufacturers. Similar advantages are provided to IoT gateway vendors in other embodiments. Also, IoT system vendors can provide end-to-end security for IoT messaging in a highly cost-effective manner using the disclosed techniques.

IoT message processing techniques as disclosed herein can be readily deployed at least in part utilizing a shared processing environment within cloud infrastructure, such as within a container-based PaaS cloud, as well as in numerous other information processing system environments.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as host devices and their corresponding programs, or portions thereof, are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement containers that are grouped based on layer structures and possibly other parameters for purposes of container management and data services in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
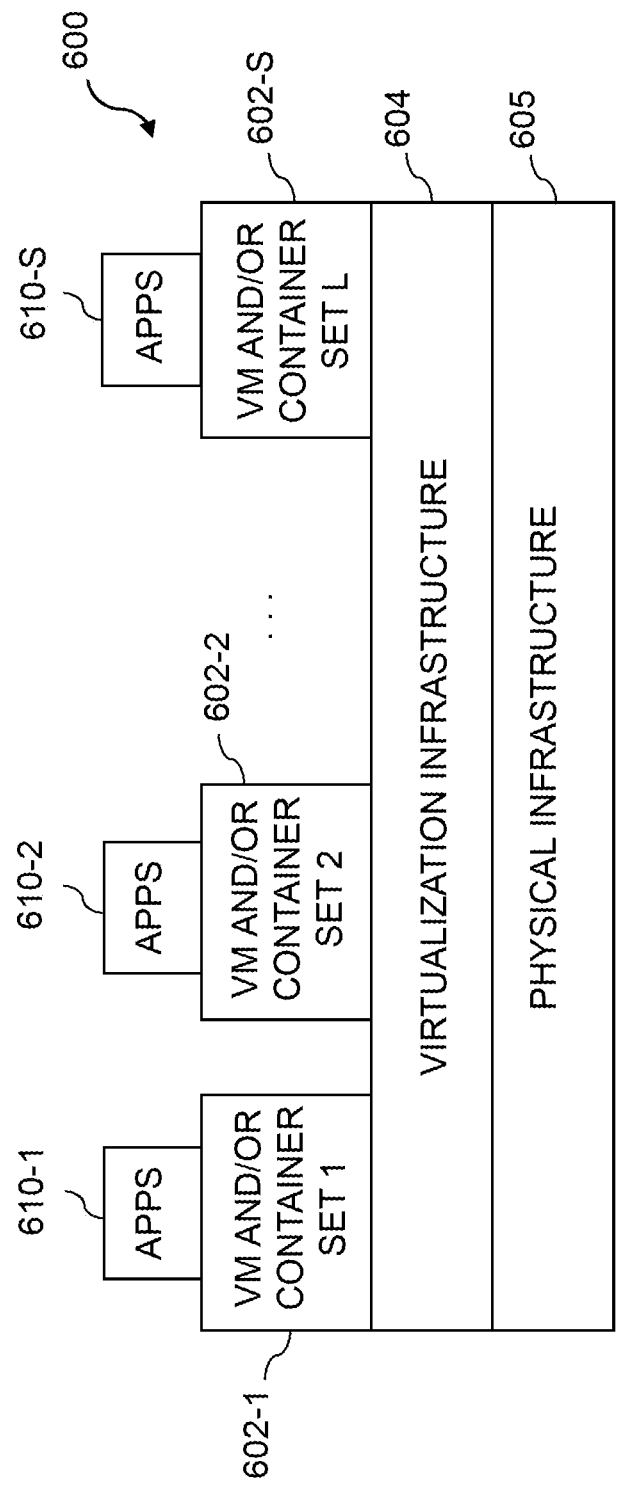
FIGS. 6 and 7 show examples of processing platforms that may be utilized to implement at least a portion of an information processing system in illustrative embodiments.
Figure 7:
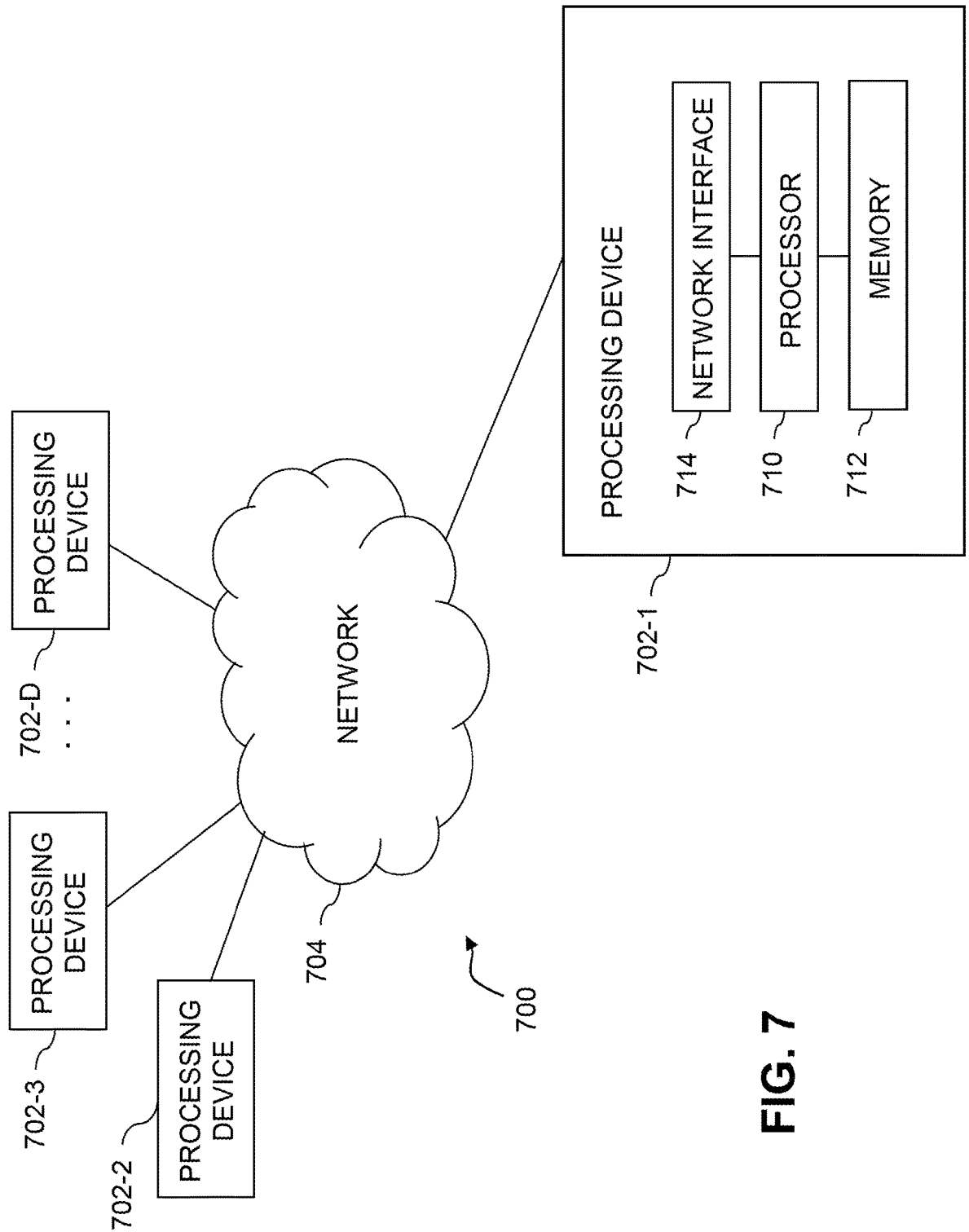

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-S implemented using virtualization infrastructure 604. The virtualization infrastructure 604 runs on physical infrastructure 605, and illustratively comprises one or more hypervisors and/or operating system level virtualization infrastructure. The cloud infrastructure 600 further comprises sets of applications 610-1, 610-2, . . . 610-S running on respective ones of the VMs/container sets 602-1, 602-2, . . . 602-S under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide IoT message processing functionality of the type described above for multiple processes running on a given one of the VMs. For example, each of the VMs can implement a cryptography engine such as the cryptography engine 120 of processing platform 106 for providing IoT message processing functionality for multiple processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. Such implementations can provide IoT message processing functionality of the type described above for multiple processes running on different ones of the containers. For example, a container host device supporting multiple containers of one or more container sets can implement a cryptography engine such as the cryptography engine 120 of processing platform 106 for providing IoT message processing functionality for the multiple containers.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-D, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure from VCE, the Virtual Computing Environment Company, now the Converged Platform and Solutions Division of Dell EMC.

A processing platform as that term is broadly used herein can include one or more storage systems. Such storage systems can comprise any of a variety of different types of storage including network-attached storage (NAS), storage area networks (SANs), direct-attached storage (DAS), distributed DAS and software-defined storage (SDS), as well as combinations of these and other storage types. The storage systems can be configured to provide storage for data of multiple distinct types, including blocks, objects and files.

These and numerous other alternative cloud computing environments or other processing platforms can be adapted in a straightforward manner to implement functionality for secure IoT messaging as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of container groups and associated data services are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IoT devices, gateways, cloud-based processing platforms, data centers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a processing platform comprising one or more processing devices each comprising a processor coupled to a memory;
the processing platform being configured to communicate over a network with a plurality of Internet of Things (IoT) devices;
the processing platform being configured:
to receive at least a first intermediate message from a first gateway of the network, the first intermediate message comprising an encrypted version of a device message, the encrypted version of the device message being based at least in part on at least one application of a designated cryptographic function to the device message utilizing a first key, the first key being generated by a given one of the plurality of IoT devices that is a source of the device message;
to receive one or more additional intermediate messages from each of one or more additional gateways of the network, at least one of the one or more additional intermediate messages received from a given one of the one or more additional gateways comprising an encrypted version of the first key, the encrypted version of the first key being based at least in part on at least one application of the designated cryptographic function to the first key utilizing a second key, the second key being generated by the given one of the one or more additional gateways;
to associate the first and one or more additional intermediate messages with one another based at least in part on a common message identifier detected in the first and one or more additional intermediate messages; and
to process the associated first and one or more additional intermediate messages, utilizing the designated cryptographic function, to recover the device message from the given one of the plurality of IoT devices;
wherein the encrypted version of the device message is included in the first intermediate message but is not included in any of the one or more additional intermediate messages; and
wherein the first intermediate message comprises the common message identifier and a result of applying a composite key to the device message, wherein the composite key comprises a result of combining a particular number of other keys, including a third key generated by the first gateway, using the designated cryptographic function.

2. The apparatus of claim 1 wherein the processing platform comprises a cloud-based data center.

3. The apparatus of claim 1 wherein the designated cryptographic function comprises a bitwise exclusive-or function.

4. The apparatus of claim 1 wherein the common message identifier comprises a randomly-generated message identifier that is unique to the device message.

5. The apparatus of claim 1 wherein the common message identifier is generated by the given one of the plurality of IoT devices.

6. The apparatus of claim 1 wherein the first intermediate message comprises the common message identifier and a result of a single application of the designated cryptographic function to the device message using the first key.

7. The apparatus of claim 1 wherein a given one of the one or more additional intermediate messages comprises the common message identifier and the second key.

8. The apparatus of claim 1 wherein the particular number of other keys is one less than a number of connected downstream gateways in a first layer of parallel gateways that the given one of the plurality of IoT devices utilizes in communicating the device message to the processing platform.

9. The apparatus of claim 1 wherein the one or more additional intermediate messages comprise a plurality of additional intermediate messages each comprising the common message identifier and a corresponding one of the other keys used to generate the composite key.

10. The apparatus of claim 1 wherein the one or more additional intermediate messages comprise a plurality of additional intermediate messages that collectively provide the first key.

11. An apparatus comprising:
a processing platform comprising one or more processing devices each comprising a processor coupled to a memory:
the processing platform being configured to communicate over a network with a plurality of Internet of Things (IoT) devices;
the processing platform being configured:
to receive at least a first intermediate message from a first gateway of the network, the first intermediate message comprising an encrypted version of a device message, the encrypted version of the device message being based at least in part on at least one application of a designated cryptographic function to the device message utilizing a first key, the first key being generated by a given one of the plurality of IoT devices that is a source of the device message;
to receive one or more additional intermediate messages from each of one or more additional gateways of the network, at least one of the one or more additional intermediate messages received from a given one of the one or more additional gateways comprising an encrypted version of the first key, the encrypted version of the first key being based at least in part on at least one application of the designated cryptographic function to the first key utilizing a second key, the second key being generated by the given one of the one or more additional gateways;
to associate the first and one or more additional intermediate messages with one another based at least in part on a common message identifier detected in the first and one or more additional intermediate messages; and
to process the associated first and one or more additional intermediate messages, utilizing the designated cryptographic function, to recover the device message from the given one of the plurality of IoT devices;

wherein the encrypted version of the device message is included in the first intermediate message but is not included in any of the one or more additional intermediate messages; and wherein the first intermediate message comprises the common message identifier and a result of multiple sequential applications of the designated cryptographic function to the device message using respective ones of a plurality of keys, the plurality of keys comprising the first key and a third key, the third key being generated by the first gateway.

12. The apparatus of claim 11 wherein one of the one or more additional intermediate messages comprises the common message identifier and the third key.

13. A method comprising:
configuring a processing platform to communicate over a network with a plurality of Internet of Things (loT) devices;
wherein the processing platform performs the following steps:
receiving at least a first intermediate message from a first gateway of the network, the first intermediate message comprising an encrypted version of a device message, the encrypted version of the device message being based at least in part on at least one application of a designated cryptographic function to the device message utilizing a first key, the first key being generated by a given one of the plurality of loT devices that is a source of the device message;
receiving one or more additional intermediate messages from each of one or more additional gateways of the network, at least one of the one or more additional intermediate messages received from a given one of the one or more additional gateways comprising an encrypted version of the first key, the encrypted version of the first key being based at least in part on at least one application of the designated cryptographic function to the first key utilizing a second key, the second key being generated by the given one of the one or more additional gateways;
associating the first and one or more additional intermediate messages with one another based at least in part on a common message identifier detected in the first and one or more additional intermediate messages; and
processing the associated first and one or more additional intermediate messages, utilizing the designated cryptographic function, to recover the device message from the given one of the plurality of loT devices;
wherein the encrypted version of the device message is included in the first intermediate message but is not included in any of the one or more additional intermediate messages; and
wherein the first intermediate message comprises the common message identifier and a result of applying a composite key to the device message, wherein the composite key comprises a result of combining a particular number of other keys, including a third key generated by the first gateway, using the designated cryptographic function.

14. The method of claim 13 wherein the one or more additional intermediate messages comprise a plurality of additional intermediate messages that collectively provide the first key.

15. A computer program product comprising a non-transitory processor-readable storage medium having stored therein program code of one or more software programs, wherein the program code when executed by a processing platform, the processing platform being configured to communicate over a network with a plurality of Internet of Things (loT) devices, causes the processing platform:
to receive at least a first intermediate message from a first gateway of the network, the first intermediate message comprising an encrypted version of a device message, the encrypted version of the device message being based at least in part on at least one application of a designated cryptographic function to the device message utilizing a first key, the first key being generated by a given one of the plurality of loT devices that is a source of the device message;
to receive one or more additional intermediate messages from each of one or more additional gateways of the network, at least one of the one or more additional intermediate messages received from a given one of the one or more additional gateways comprising an encrypted version of the first key, the encrypted version of the first key being based at least in part on at least one application of the designated cryptographic function to the first key utilizing a second key, the second key being generated by the given one of the one or more additional gateways;
to associate the first and one or more additional intermediate messages with one another based at least in part on a common message identifier detected in the first and one or more additional intermediate messages; and
to process the associated first and one or more additional intermediate messages, utilizing the designated cryptographic function, to recover the device message from the given one of the plurality of loT devices;
wherein the encrypted version of the device message is included in the first intermediate message but is not included in any of the one or more additional intermediate messages; and
wherein the first intermediate message comprises the common message identifier and a result of applying a composite key to the device message, wherein the composite key comprises a result of combining a particular number of other keys, including a third key generated by the first gateway, using the designated cryptographic function.

16. The computer program product of claim 15 wherein the one or more additional intermediate messages comprise a plurality of additional intermediate messages that collectively provide the first key.

17. The computer program product of claim 15 wherein the first intermediate message comprises the common message identifier and a result of a single application of the designated cryptographic function to the device message using the first key.

18. The computer program product of claim 15 wherein a given one of the one or more additional intermediate messages comprises the common message identifier and the second key.

19. The computer program product of claim 15 wherein the first intermediate message comprises the common message identifier and a result of multiple sequential applications of the designated cryptographic function to the device message using respective ones of a plurality of keys, the plurality of keys comprising the first key and a third key, the third key being generated by the first gateway.

20. The computer program product of claim 15 wherein the particular number of other keys is one less than a number of connected downstream gateways in a first layer of parallel gateways that the given one of the plurality of IoT devices utilizes in communicating the device message to the processing platform.

\* \* \* \* \*